(12) United States Patent
Iwakiri et al.

(10) Patent No.: US 11,976,667 B2
(45) Date of Patent: May 7, 2024

(54) CENTRIFUGAL COMPRESSOR AND TURBOCHARGER

(71) Applicant: MITSUBISHI HEAVY INDUSTRIES ENGINE & TURBOCHARGER, LTD., Sagamihara (JP)

(72) Inventors: Kenichiro Iwakiri, Tokyo (JP); Isao Tomita, Tokyo (JP); Masaki Tojo, Sagamihara (JP); Takashi Yoshimoto, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 120 days.

(21) Appl. No.: 17/439,141

(22) PCT Filed: Mar. 19, 2019

(86) PCT No.: PCT/JP2019/011544
§ 371 (c)(1),
(2) Date: Sep. 14, 2021

(87) PCT Pub. No.: WO2020/188770
PCT Pub. Date: Sep. 24, 2020

(65) Prior Publication Data
US 2022/0154729 A1 May 19, 2022

(51) Int. Cl.
*F04D 29/42* (2006.01)
*F04D 25/02* (2006.01)
*F04D 29/46* (2006.01)

(52) U.S. Cl.
CPC ....... *F04D 29/4213* (2013.01); *F04D 25/024* (2013.01); *F04D 29/464* (2013.01); *F05D 2220/40* (2013.01); *F05D 2250/51* (2013.01)

(58) Field of Classification Search
CPC .. F04D 29/4213; F04D 25/024; F04D 29/464; F05D 2220/40; F05D 2250/51
(Continued)

(56) References Cited

U.S. PATENT DOCUMENTS 5,863,178 A * 1/1999 Scheinert ............ F04D 27/0215
415/58.4
9,777,640 B2 10/2017 Mohtar et al.
(Continued)

FOREIGN PATENT DOCUMENTS

EP 1 947 299 A2 7/2008
EP 3 051 099 A1 8/2016
(Continued)

OTHER PUBLICATIONS

International Preliminary Report on Patentability and Written Opinion of the International Searching Authority for International Application No. PCT/JP2019/011544, dated Sep. 30, 2021, with English translation.
(Continued)

*Primary Examiner* — J. Todd Newton
(74) *Attorney, Agent, or Firm* — BIRCH, STEWART, KOLASCH & BIRCH, LLP

(57) ABSTRACT

A centrifugal compressor comprises: an impeller; an inlet pipe portion forming an intake passage to introduce air to the impeller; and a throttle mechanism capable of reducing a flow passage area of the intake passage upstream of the impeller. The throttle mechanism includes an annular portion configured to move between a first position and a second position upstream of the first position in an axial direction of the impeller. In a cross-section along a rotational axis of the impeller, an outer peripheral surface of the annular portion is formed to smoothly connect a leading edge and a trailing edge of the annular portion.

4 Claims, 15 Drawing Sheets

(58) Field of Classification Search
USPC .............................................................. 415/1
See application file for complete search history.

(56) References Cited

U.S. PATENT DOCUMENTS

| | | |
|---|---|---|
| 2015/0192147 A1 | 7/2015 | An et al. |
| 2016/0123333 A1* | 5/2016 | Mohtar ................. F02B 37/225 |
| | | 417/406 |
| 2016/0131145 A1* | 5/2016 | Mohtar ................... F02B 37/22 |
| | | 417/380 |
| 2016/0146099 A1 | 5/2016 | Mohtar et al. |
| 2017/0260987 A1* | 9/2017 | Onodera ............... F04D 29/685 |
| 2017/0298943 A1 | 10/2017 | Mohtar et al. |

FOREIGN PATENT DOCUMENTS

| | | |
|---|---|---|
| JP | 55-100100 U | 7/1980 |
| JP | 4-311633 A | 11/1992 |
| JP | 5223642 B2 | 6/2013 |
| JP | 5824821 B2 | 12/2015 |
| JP | 2018-131986 A | 8/2018 |
| WO | WO 2014/030248 A1 | 2/2014 |

OTHER PUBLICATIONS

International Search Report for International Application No. PCT/JP2019/011544, dated Jun. 25, 2019.

\* cited by examiner

CENTRIFUGAL COMPRESSOR AND TURBOCHARGER

TECHNICAL FIELD

The present disclosure relates to a centrifugal compressor and a turbocharger.

BACKGROUND ART

In recent years, for widening the operating range and improving efficiency at the operating point on the low flow rate side (near the surge point) of a centrifugal compressor, it has been proposed to install a throttle mechanism (inlet variable mechanism) at the inlet pipe portion of the centrifugal compressor, as described in Patent Document 1, for example.

At the low flow rate operating point of the centrifugal compressor, backflow tends to occur on the tip side of the impeller blades. The throttle mechanism described in Patent Document 1 has an annular portion disposed in the intake passage to suppress the backflow, and reduces the flow passage area of the intake passage by blocking an outer peripheral portion of the intake passage corresponding to the tip side of the impeller blades. When the flow passage area of the intake passage is reduced, although the peak efficiency is reduced due to the reduced area, it is possible to reduce the surge flow rate and improve the efficiency near the surge point. In other words, by performing a variable control to increase the flow passage area of the intake passage during operation on the high flow rate side and to reduce the flow passage area of the intake passage during operation on the low flow rate side, it is possible to achieve wide range and improved efficiency at the operating point on the low flow rate side. This indicates that the impeller blade height is lowered (trimmed) to be adapted to the low flow rate operating point artificially, which is called variable inlet compressor (VIC) or variable trim compressor (VTC).

CITATION LIST

Patent Literature

Patent Document 1: U.S. Pat. No. 9,777,640B

SUMMARY

Problems to be Solved

Patent Document 1 discloses, as one throttle mechanism, a system of adjusting the flow passage area of the intake passage by moving the annular portion between the first position and the second position upstream of the first position in the axial direction of the impeller.

However, in the throttle mechanism described in Patent Document 1, in a cross-section along the rotational axis of the impeller, the outer peripheral surface of the annular portion has a polygonal shape (shape with discontinuous change in curvature). Accordingly, when air flows along the annular portion, the flow is separated on the outer peripheral surface of the annular portion, and the separation causes a reduction in efficiency of the centrifugal compressor.

In view of the above, an object of at least one embodiment of the present invention is to provide a centrifugal compressor that can improve the efficiency at the low flow rate operating point, and a turbocharger including the same.

Solution to the Problems (1) A centrifugal compressor according to at least one embodiment of the present invention comprises: an impeller; an inlet pipe portion forming an intake passage to introduce air to the impeller; and a throttle mechanism capable of reducing a flow passage area of the intake passage upstream of the impeller. The throttle mechanism includes an annular portion configured to move between a first position and a second position upstream of the first position in an axial direction of the impeller. In a cross-section along a rotational axis of the impeller, an outer peripheral surface of the annular portion is formed to smoothly connect a leading edge and a trailing edge of the annular portion.

With the centrifugal compressor described in the above (1), by reducing the flow passage area of the intake passage by the throttle mechanism upstream of the impeller, it is possible to improve the efficiency at the low flow rate operating point. Further, since the outer peripheral surface of the annular portion is formed so as to smoothly connect the leading edge and the trailing edge of the annular portion, it is possible to suppress the separation of flow on the outer peripheral surface of the annular portion when air flows along the annular portion. Thus, it is possible to achieve a high efficiency at the low flow rate operating point.

(2) In some embodiments, in the centrifugal compressor described in the above (1), a thickness of a leading edge portion of the annular portion decreases upstream in the axial direction.

With the centrifugal compressor described in the above (2), the increase in pressure loss due to the flow impinging on the leading edge portion of the annular portion can be suppressed.

(3) In some embodiments, in the centrifugal compressor described in the above (1) or (2), a thickness of a trailing edge portion of the annular portion decreases downstream in the axial direction.

With the centrifugal compressor described in the above (3), the increase in pressure loss caused on the back side of the trailing edge portion of the annular portion can be suppressed.

(4) In some embodiments, in the centrifugal compressor described in any one of the above (1) to (3), a thickness of the annular portion smoothly changes from the leading edge to the trailing edge of the annular portion.

With the centrifugal compressor described in the above (4), the flow can be smoothly directed along the annular portion from the leading edge to the trailing edge of the annular portion.

(5) In some embodiments, in the centrifugal compressor described in any one of the above (1) to (4), in a cross-section along the rotational axis of the impeller, the outer peripheral surface of the annular portion includes a convex curve.

With the centrifugal compressor described in the above (5), since the outer peripheral surface of the annular portion includes a convex curve, the annular portion functions as the guide vane, which deflects the flow along the outer peripheral surface inward (impeller side) in the radial direction, so that the increase in pressure loss due to the annular portion can be suppressed.

(6) In some embodiments, in the centrifugal compressor described in any one of the above (1) to (5), in a cross-section along the rotational axis of the impeller, the annular portion has an airfoil shape.

With the centrifugal compressor described in the above (6), since the annular portion has an airfoil shape in a cross-section along the rotational axis of the impeller, the increase in pressure loss due to the annular portion can be suppressed. Further, since the outer peripheral surface of the annular portion includes a convex curve in a cross-section along the rotational axis of the impeller, the annular portion functions as the guide vane, which deflects the flow along the outer peripheral surface inward (impeller side) in the radial direction, so that the increase in pressure loss due to the annular portion can be suppressed.

(7) In some embodiments, in the centrifugal compressor described in any one of the above (1) to (6), in a cross-section along the rotational axis of the impeller, a thickness of the annular portion is maximum at a position satisfying X/D<0.6, where X is a distance from the leading edge along a straight line connecting the leading edge and the trailing edge of the annular portion, and D is a distance between the leading edge and the trailing edge.

With the centrifugal compressor described in the above (7), compared to the configuration in which the thickness of the annular portion is maximum near the trailing edge of the annular portion as described in Patent Document 1, the generation of flow turbulence (wake) after passing through the annular portion can be suppressed. As a result, it is possible to suppress the reduction in performance of the impeller due to the wake flowing into the impeller.

(8) In some embodiments, in the centrifugal compressor described in any one of the above (1) to (7), in a cross-section along the rotational axis of the impeller, a straight line connecting the leading edge and the trailing edge of the annular portion is inclined outward in a radial direction of the impeller as going upstream in the axial direction.

In order to increase the effect of efficiency improvement at the low flow rate operating point by the throttle mechanism, it is desirable to secure a certain constriction amount of the flow passage area of the intake passage. If the constriction amount by the throttle mechanism is increased by simply increasing the thickness of the annular portion (thickness in the direction perpendicular to the straight line connecting the leading edge and the trailing edge of the annular portion), the pressure loss when air passes through the annular portion increases as the thickness of the annular portion increases.

However, in the centrifugal compressor described in the above (8), since the straight line connecting the leading edge and the trailing edge of the annular portion is inclined outward in the radial direction as it goes upstream in the axial direction, the constriction amount by the throttle mechanism can be increased while suppressing the increase in thickness of the annular portion. Accordingly, it is possible to efficiently increase the efficiency at the low flow rate operating point while suppressing the increase in pressure loss due to the thickness of the annular portion. Further, the increase in pressure loss can also be suppressed in that the air flow along the inclined surface can be smoothly directed to the downstream side of the annular portion.

(9) In some embodiments, in the centrifugal compressor described in the above (8), an inner peripheral surface of the inlet pipe portion includes an inclined surface that is inclined such that an inner diameter of the inlet pipe portion increases upstream in the axial direction. In a cross-section along the rotational axis of the impeller, an angle between the straight line and the axial direction is smaller than an angle between the inclined surface and the axial direction.

When the annular portion is in the second position, since the annular portion is separated from the inclined surface inward in the radial direction, the angle between the streamline near the annular portion and the axial direction is smaller than the angle between the inclined surface and the axial direction. Therefore, when the angle between the straight line connecting the leading edge and the trailing edge of the annular portion and the axial direction is smaller than the angle between the inclined surface and the axial direction as described above, the air can be smoothly directed toward the impeller along the annular portion, and the pressure loss due to the annular portion can be effectively reduced.

(10) In some embodiments, in the centrifugal compressor described in any one of the above (1) to (9), in a cross-section along the rotational axis of the impeller, when CL is a center line connecting the leading edge and the trailing edge of the annular portion and passing through a center position in a thickness direction of the annular portion, an angle between the center line CL and the axial direction at a position of the trailing edge is greater than an angle between the center line CL and the axial direction at a position of the leading edge.

In order to suppress the increase in pressure loss due to the annular portion, it is desirable that the leading edge portion of the annular portion is positioned upstream of the upstream end of the inclined surface when the annular portion is in the second position. In this case, streamlines around the annular portion are directed in the axial direction near the leading edge of the annular portion and are directed in the radial direction near the trailing edge of the annular portion. Therefore, as described in the above (10), when the angle between the center line CL and the axial direction at the position of the trailing edge of the annular portion is greater than the angle between the center line CL and the axial direction at the position of the leading edge of the annular portion, the shape of the annular portion can be adapted to the change in curvature of the streamlines, and the increase in pressure loss due to the annular portion can be suppressed.

(11) In some embodiments, in the centrifugal compressor described in the above (10), an inner peripheral surface of the inlet pipe portion includes an inclined surface that is inclined such that an inner diameter of the inlet pipe portion increases upstream in the axial direction. In a cross-section along the rotational axis of the impeller, the angle between the center line CL and the axial direction at the position of the trailing edge is smaller than an angle between the inclined surface and the axial direction.

When the annular portion is in the second position and is separated from the inclined surface inward in the radial direction, the angle between the streamline near the trailing edge of the annular portion and the axial direction is smaller than the angle between the inclined surface and the axial direction. Therefore, when the angle between the center line CL and the axial direction at the position of the trailing edge is smaller than the angle between the inclined surface and the axial direction, the increase in pressure loss near the trailing edge of the annular portion can be suppressed.

(12) In some embodiments, in the centrifugal compressor described in the above (10) or (11), the center line CL smoothly connects the leading edge and the trailing edge.

With the centrifugal compressor described in the above (12), the air can be smoothly directed toward the impeller along the annular portion.

(13) In some embodiments, in the centrifugal compressor described in any one of the above (1) to (12), an inner peripheral surface of the inlet pipe portion includes a concave curved surface formed so as to face the outer peripheral surface of the annular portion when the annular portion is in the second position.

With the centrifugal compressor described in the above (13), a concave curved surface can be formed on the inner peripheral surface of the inlet pipe portion such that the flow passage area of the intake passage does not have a minimum value, and a configuration in which no throat is formed between the inner peripheral surface of the inlet pipe portion and the outer peripheral surface of the annular portion can be achieved, so that the increase in pressure loss can be effectively suppressed.

(14) In some embodiments, in the centrifugal compressor described in the above (13), the concave curved surface is formed such that a flow passage area of the intake passage does not have a minimum value in an existence range of the annular portion in the axial direction when the annular portion is in the second position.

With the centrifugal compressor described in the above (14), a configuration in which no throat is formed between the inner peripheral surface of the inlet pipe portion and the outer peripheral surface of the annular portion can be achieved, so that the increase in pressure loss can be effectively suppressed.

(15) A turbocharger according to at least one embodiment of the present invention comprises a centrifugal compressor described in any one of the above (1) to (14).

With the centrifugal compressor described in the above (15), since the centrifugal compressor described in any one of the above (1) to (14) is included, it is possible to suppress the separation of flow on the outer peripheral surface when the annular portion is in the second position. Thus, it is possible to suppress the reduction in efficiency of the centrifugal compressor.

Advantageous Effects

At least one embodiment of the present invention provides a centrifugal compressor that can improve the efficiency at the low flow rate operating point, and a turbocharger including the same.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
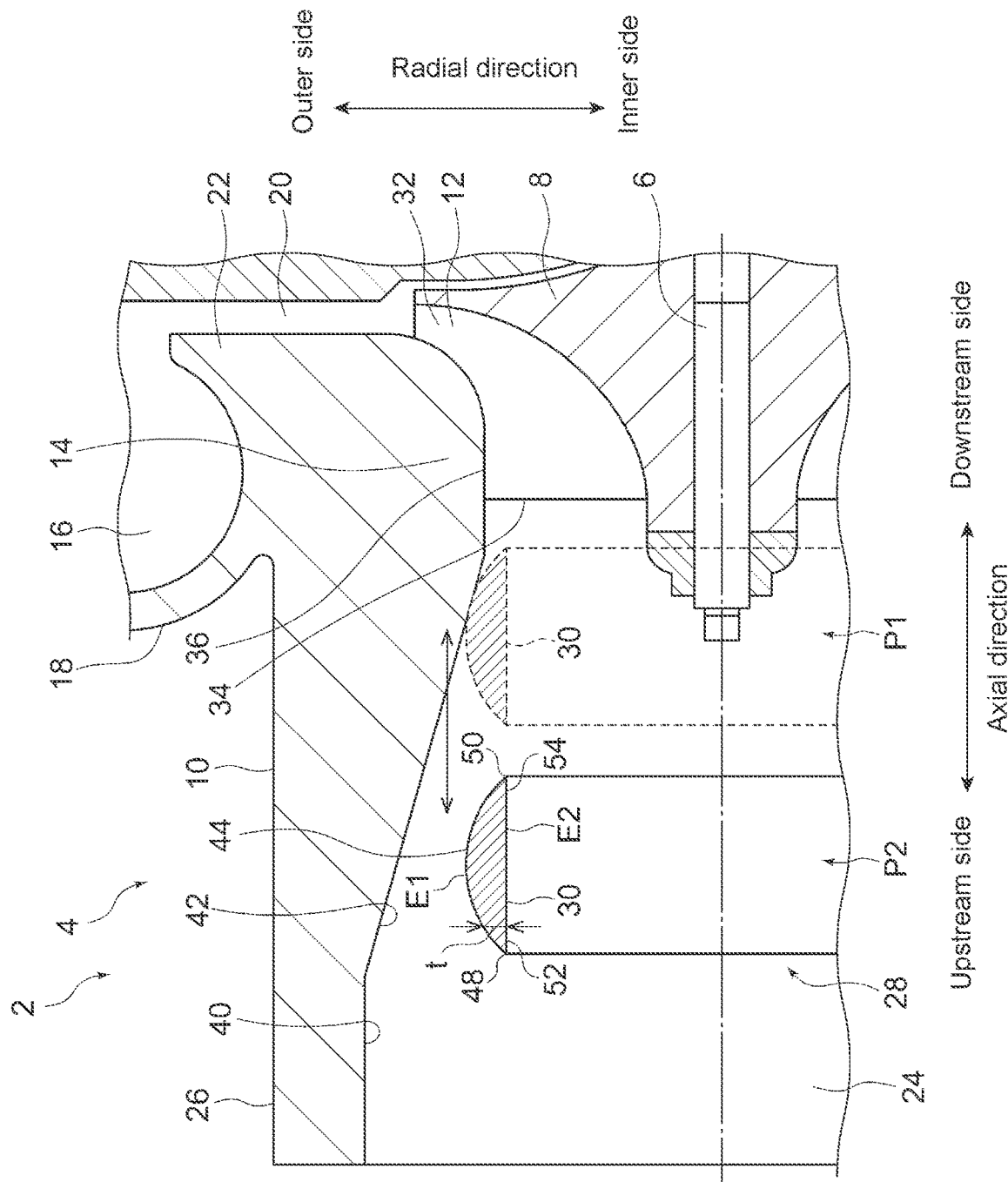
FIG. 1 is a schematic cross-sectional view of a centrifugal compressor 4 of a turbocharger 2 according to an embodiment.

FIG. 1 is a schematic cross-sectional view of a centrifugal compressor 4 of a turbocharger 2 according to an embodiment. The centrifugal compressor 4 is connected to a turbine (not shown) via a rotational shaft 6, and compresses the air taken by an internal combustion engine (not shown) as the rotational power of the turbine driven by exhaust gas of the internal combustion engine (not shown) is transmitted via the rotational shaft 6.

As shown in FIG. 1, the centrifugal compressor 4 includes an impeller 8 and a casing 10 housing the impeller 8. The casing 10 includes a shroud wall portion 14 surrounding the impeller 8 so as to form an impeller housing space 12 in which the impeller 8 is placed, a scroll portion 18 forming a scroll passage 16 on the outer peripheral side of the impeller housing space 12, and a diffuser portion 22 forming a diffuser passage 20 connecting the impeller housing space 12 and the scroll passage 16. Further, the casing 10 includes an inlet pipe portion 26 forming an intake passage 24 to introduce air to the impeller 8 along the rotational axis of the impeller 8. The inlet pipe portion 26 is disposed concentrically with the impeller 8.

Hereinafter, the axial direction of the impeller 8 is referred to as merely "axial direction", and the radial direction of the impeller 8 is referred to as merely "radial direction", and the circumferential direction of the impeller 8 is referred to as merely "circumferential direction".

The centrifugal compressor 4 includes a throttle mechanism 28 (inlet variable mechanism) capable of reducing the flow passage area of the intake passage 24 upstream of the impeller 8 in the axial direction. The throttle mechanism 28 includes an annular portion 30 (movable portion) disposed in the intake passage 24 concentrically with the impeller 8.

The annular portion 30 is configured to be movable along the axial direction between a first position P1 and a second position P2 upstream of the first position P1 in the axial direction. The annular portion 30 is supported by a strut (not shown), and moves between the first position P1 and the second position P2 by the driving force transmitted from an actuator (not shown) through the strut.

An inner peripheral surface 40 of the inlet pipe portion 26 includes an inclined surface 42 that is inclined such that the inner diameter of the inlet pipe portion 26 increases upstream in the axial direction in order to suppress the increase in pressure loss due to the annular portion 30. In the illustrated exemplary embodiment, the inclined surface 42 is linearly shaped in a cross-section along the rotational axis of the impeller 8.

An outer peripheral surface 44 of the annular portion 30 is disposed so as to face the inclined surface 42. When the annular portion 30 is in the second position P2, the outer peripheral surface 44 of the annular portion 30 is separated from the inclined surface 42. As the annular portion 30 moves downstream in the axial direction from the second position P2, the distance between the outer peripheral surface 44 of the annular portion 30 and the inclined surface 42 decreases. The annular portion 30 is configured to come into contact with the inclined surface 42 when it is in the first position P1 to block an outer peripheral portion 38 of the intake passage 24 corresponding to a tip portion 36 of a blade 32 of the impeller 8 (a radially outer end portion of the blade 32). The annular portion 30 faces a leading edge 34 of the tip portion 36 of the blade 32 of the impeller 8 in the axial direction when it is in the first position P1. In other words, in an axial view, the annular portion 30 and the tip portion 36 at least partially overlap.

Thus, the annular portion 30 reduces the flow passage area of the intake passage 24 by blocking the outer peripheral portion 38 of the intake passage 24 corresponding to the tip portion 36 of the blade 32 of the impeller 8. As a result, although the peak efficiency is reduced due to the reduced flow passage area, it is possible to reduce the surge flow rate and improve the efficiency near the surge point. In other words, by adjusting the throttle mechanism 28 so that the annular portion 30 is in the first position P1 at the low flow rate operating point (operating point near the surge point) and the annular portion 30 is in the second position P2 at the high flow rate operating point (for example, during rated operation) where the flow rate is higher than the low flow rate operating point, the efficiency of the low flow rate operating point can be improved, and the operating range of the centrifugal compressor 4 can be expanded.

An outer peripheral surface 44 of the annular portion 30 is formed so as to smoothly connect a leading edge 48 and a trailing edge 50 of the annular portion 30. In other words, in a cross-section along the rotational axis of the impeller 8, the change in curvature of the outer peripheral surface 44 of the annular portion 30 is smooth from the leading edge 48 to the trailing edge 50 of the annular portion 30. Here, the leading edge 48 of the annular portion 30 means the upstream end of the annular portion 30 in the axial direction, and the trailing edge 50 of the annular portion 30 means the downstream end of the annular portion 30 in the axial direction.

Thus, since the outer peripheral surface 44 of the annular portion 30 is formed so as to smoothly connect the leading edge 48 and the trailing edge 50 of the annular portion 30, it is possible to suppress the separation of flow on the outer peripheral surface 44 of the annular portion 30 when the annular portion 30 is in the second position P2. Thus, it is possible to suppress the reduction in efficiency of the centrifugal compressor.

In the exemplary embodiment shown in FIG. 1, in a cross-section along the rotational axis of the impeller 8, the outer peripheral surface 44 of the annular portion 30 is formed by a convex curve E1 curved so as to smoothly connect the leading edge 48 and the trailing edge 50, and an inner peripheral surface 58 of the annular portion 30 is formed by a straight line E2 connecting the leading edge 48 and the trailing edge 50. In the illustrated exemplary embodiment, the convex curve E1 is a circular arc.

Thus, since the outer peripheral surface 44 of the annular portion 30 is formed by the convex curve E1 connecting the leading edge 48 and the trailing edge 50, the annular portion 30 functions as the guide vane, which deflects the flow along the outer peripheral surface 44 inward (impeller 8 side) in the radial direction, so that the increase in pressure loss due to the annular portion 30 can be suppressed.

In some embodiments, for example as shown in FIG. 1, the thickness t of a leading edge portion 52 of the annular portion 30 decreases upstream in the axial direction, and the thickness t of a trailing edge portion 54 of the annular portion 30 decreases downstream in the axial direction. Here, the leading edge portion 52 of the annular portion 30 means the upstream end portion of the annular portion 30 in the axial direction, and the trailing edge portion 54 of the annular portion 30 means the downstream end portion of the annular portion 30 in the axial direction. Further, the thickness t of the annular portion 30 means the thickness in the direction perpendicular to the straight line connecting the leading edge 48 and the trailing edge 50 of the annular portion 30.

Thus, since the thickness of the leading edge portion 52 of the annular portion 30 decreases upstream in the axial direction, the increase in pressure loss due to the flow impinging on the leading edge portion 52 of the annular portion 30 can be suppressed. Further, since the trailing edge portion 54 of the annular portion 30 decreases downstream in the axial direction, the increase in pressure loss caused on the back side of the trailing edge portion 54 of the annular portion 30 can be suppressed.

Figure 2:
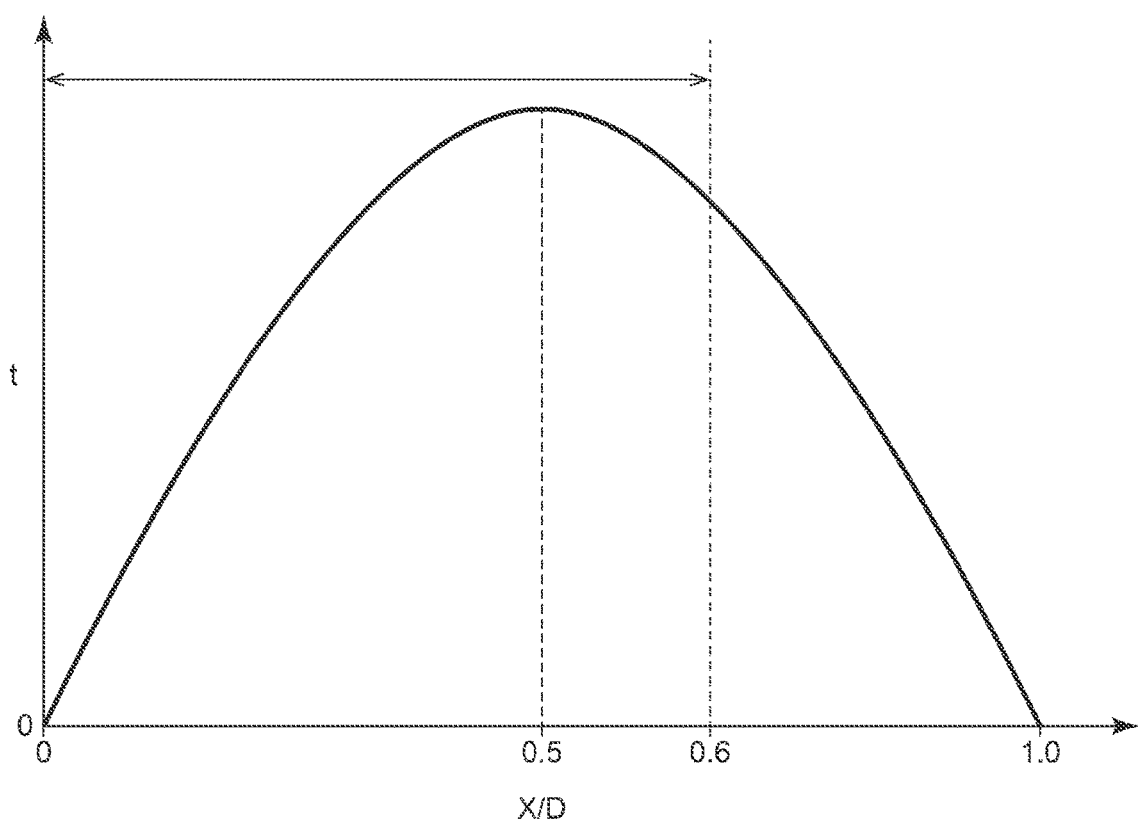
FIG. 2 is a diagram showing the blade thickness distribution of the annular portion 30 shown in FIG. 1.

FIG. 2 is a diagram showing the blade thickness distribution of the annular portion 30 shown in FIG. 1. The graph shown in FIG. 2 shows a relationship between the ratio X/D of distance X to distance D and the thickness t of the annular portion 30, where X is a distance from the leading edge 48 along the straight line connecting the leading edge 48 and the trailing edge 50 of the annular portion 30, and D is a distance between the leading edge 48 and the trailing edge 50, in a cross-section shown in FIG. 1.

As shown in FIG. 2, the thickness t of the annular portion 30 increases smoothly from the leading edge 48 of the annular portion 30 to the position where X/D=0.5 is satisfied, and decreases smoothly from the position where X/D=0.5 is satisfied to the trailing edge 50.

Thus, since the thickness t of the annular portion 30 smoothly changes from the leading edge 48 to the trailing edge 50 of the annular portion 30, the flow can be smoothly directed along the annular portion 30 from the leading edge 48 to the trailing edge 50 of the annular portion 30. Further, the thickness t of the annular portion 30 is maximum at the position where X/D<0.6 is satisfied. Accordingly, compared to the configuration in which the thickness of the annular portion is maximum near the trailing edge of the annular portion as described in Patent Document 1, the generation of flow turbulence (wake) after passing through the annular portion 30 can be suppressed. As a result, it is possible to suppress the reduction in performance of the impeller 8 due to the wake flowing into the impeller 8.

Figure 3:
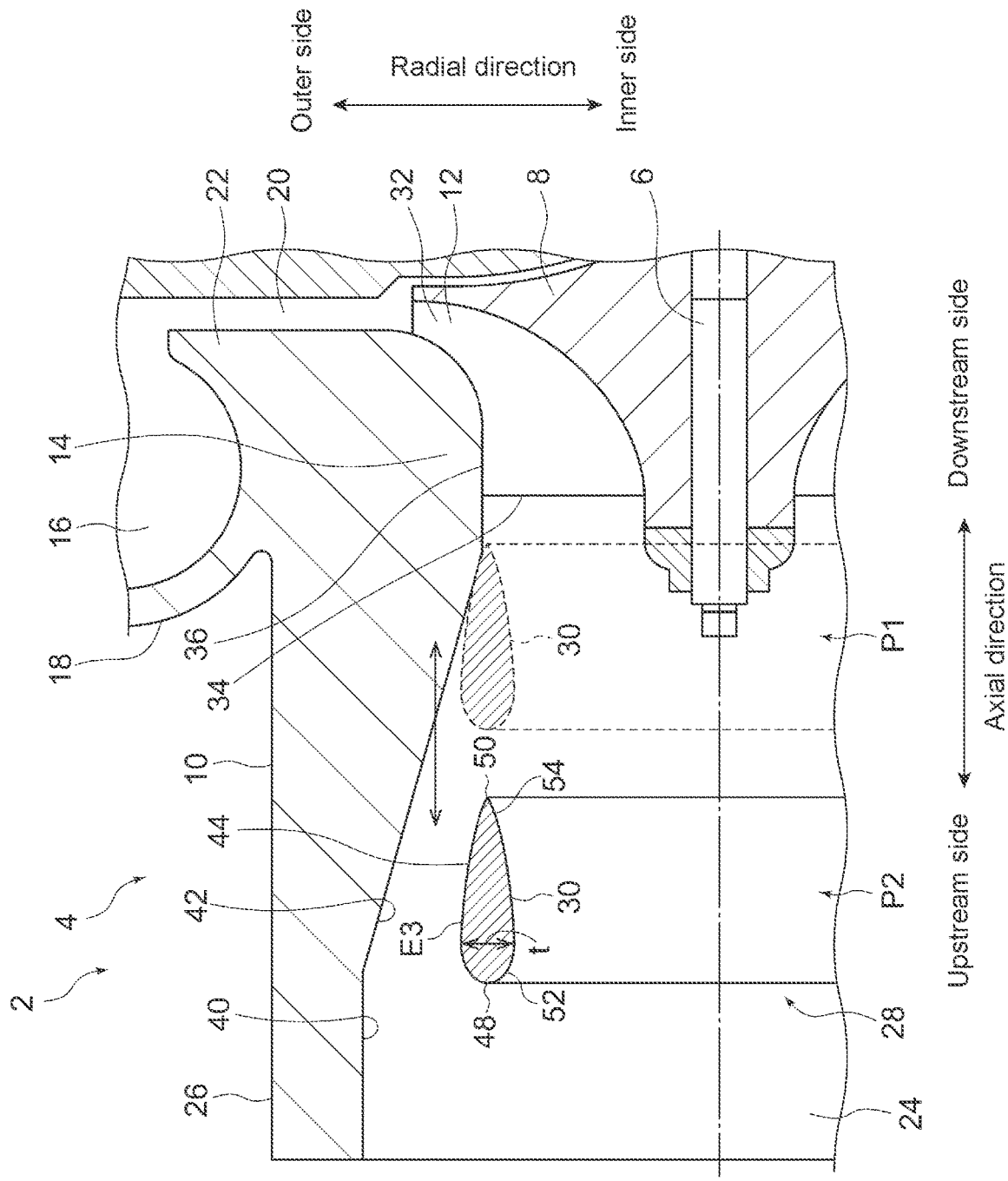
FIG. 3 is a schematic cross-sectional view of the centrifugal compressor 4 of the turbocharger 2 according to another embodiment.

FIG. 3 is a schematic cross-sectional view of the centrifugal compressor 4 of the turbocharger 2 according to another embodiment. In the other embodiments of the centrifugal compressor 4 described below, reference signs common to the components of the centrifugal compressor 4 shown in FIG. 1 indicate the same components of the centrifugal compressor shown in FIG. 1 unless otherwise noted, and the explanation is omitted.

In some embodiments, for example as shown in FIG. 3, the annular portion 30 may have an airfoil shape in a cross-section along the rotational axis of the impeller 8. In a cross-section along the rotational axis of the impeller 8, the outer peripheral surface 44 of the annular portion 30 includes a convex curve E3 that is smoothly curved.

Figure 4:
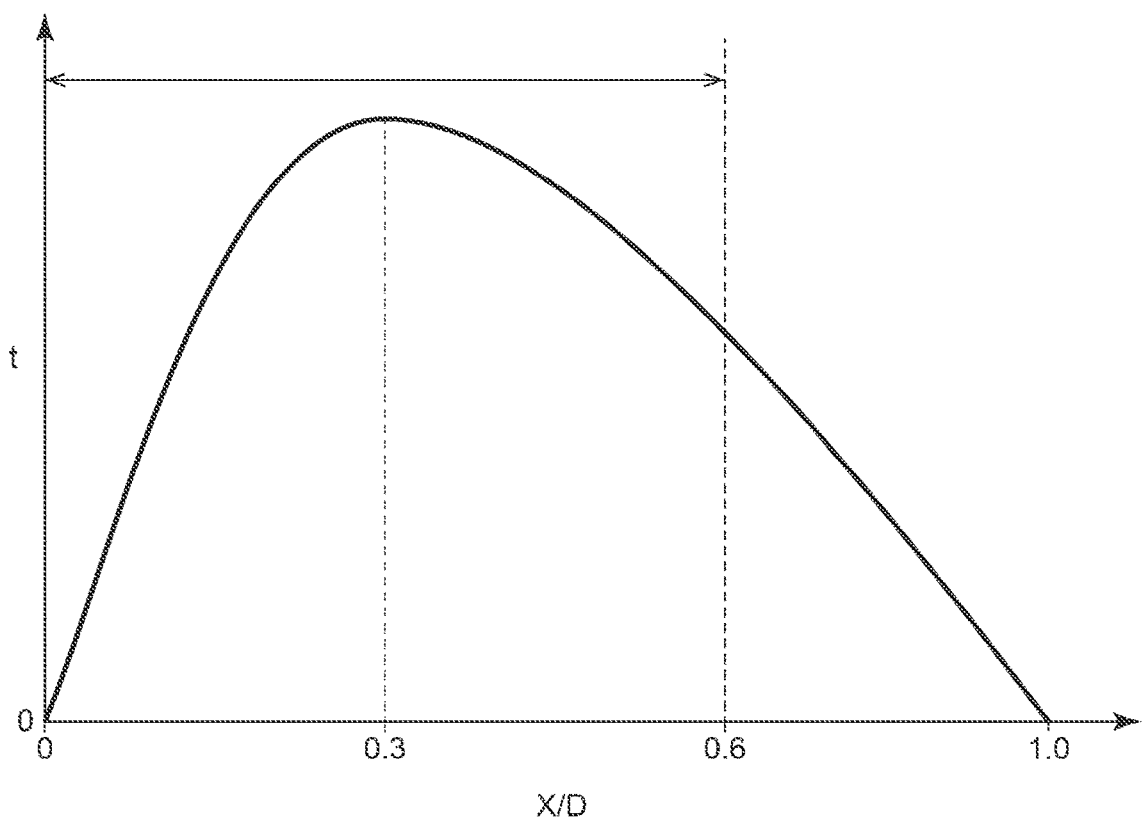
FIG. 4 is a diagram showing the blade thickness distribution of the annular portion 30 shown in FIG. 3.

FIG. 4 is a diagram showing the blade thickness distribution of the annular portion 30 shown in FIG. 3. The graph shown in FIG. 4 shows a relationship between the ratio X/D of distance X to distance D and the thickness t of the annular portion 30, where X is a distance from the leading edge 48 along the straight line connecting the leading edge 48 and the trailing edge 50 of the annular portion 30, and D is a distance between the leading edge 48 and the trailing edge 50, in a cross-section shown in FIG. 3.

As shown in FIG. 4, the thickness t of the annular portion 30 increases smoothly from the leading edge 48 of the annular portion 30 to the position where X/D=0.3 is satisfied, and decreases smoothly from the position where X/D=0.3 is satisfied to the trailing edge 50.

Thus, since the thickness t of the annular portion 30 smoothly changes from the leading edge 48 to the trailing edge 50 of the annular portion 30, the flow can be smoothly directed along the annular portion 30 from the leading edge 48 to the trailing edge 50 of the annular portion 30. Further, the thickness t of the annular portion 30 is maximum at the position where X/D<0.6 (in the illustrated embodiment, 0.2<X/D<0.4) is satisfied. Accordingly, compared to the configuration in which the thickness of the annular portion is maximum near the trailing edge of the annular portion as described in Patent Document 1, the generation of wake can be suppressed. As a result, it is possible to suppress the reduction in performance of the impeller 8 due to the wake flowing into the impeller 8.

Figure 5A:
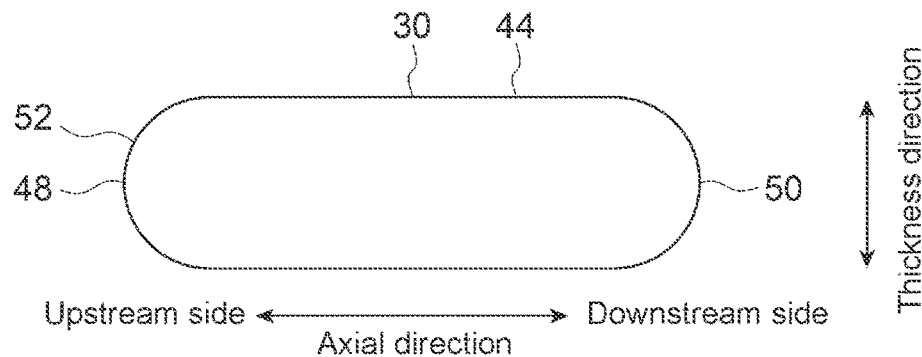
FIG. 5A is a diagram showing another example of the shape of the annular portion 30 in a cross-section along the rotational axis of the impeller 8.
Figure 5B:
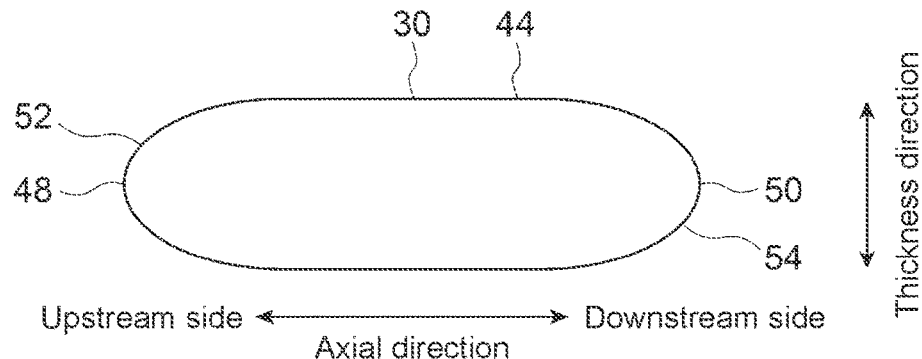
FIG. 5B is a diagram showing another example of the shape of the annular portion 30 in a cross-section along the rotational axis of the impeller 8.

In some embodiments, for example as shown in FIGS. 5A and 5B, the leading edge portion 52 of the annular portion 30 and the trailing edge portion 54 of the annular portion 30 may have a blunt shape. Each of the leading edge portion 52 and the trailing edge portion 54 of the annular portion 30 shown in FIG. 5A is formed by an arc having a certain radius of curvature in a cross-section along the rotational axis of the impeller 8, and the leading edge portion 52 and the trailing edge portion 54 are connected by a pair of straight lines. Each of the leading edge portion 52 and the trailing edge portion 54 of the annular portion 30 shown in FIG. 5B is formed by a part of ellipse in a cross-section along the rotational axis of the impeller 8, and the leading edge portion 52 and the trailing edge portion 54 are connected by a pair of straight lines. The ellipse that defines a part of the shape shown in FIG. 5B may have a ratio of minor to major axis of about 1:2 from the viewpoint of reducing the pressure loss.

Figure 5C:
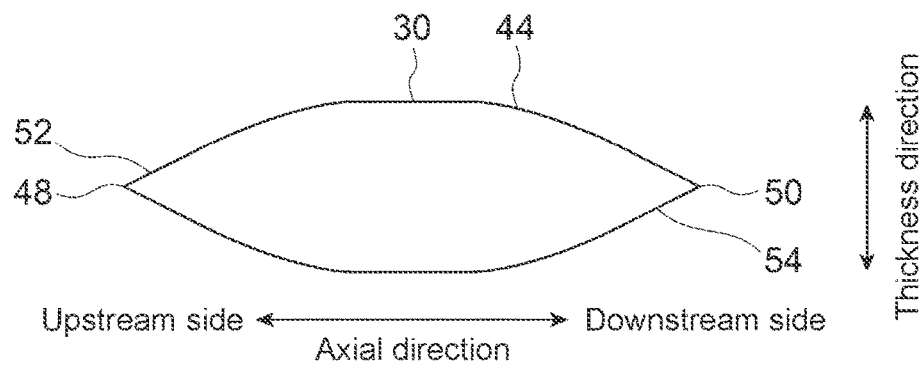
FIG. 5C is a diagram showing another example of the shape of the annular portion 30 in a cross-section along the rotational axis of the impeller 8.
Figure 5D:
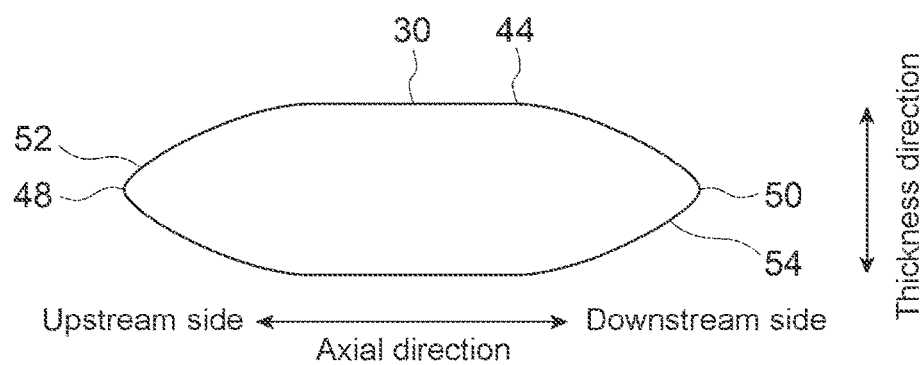
FIG. 5D is a diagram showing another example of the shape of the annular portion 30 in a cross-section along the rotational axis of the impeller 8.

In some embodiments, for example as shown in FIGS. 5C and 5D, the leading edge portion 52 of the annular portion 30 and the trailing edge portion 54 of the annular portion 30 may have a sharp shape. In this case, in a cross-section along the rotational axis of the impeller 8, each of the leading edge portion 52 and the trailing edge portion 54 of the annular portion 30 may include a pair of straight lines connected at one end in the axial direction as shown in FIG. 5C or may include a pair of curves connected at one end in the axial direction as shown in FIG. 5D.

In any of the above-described embodiments, the outer peripheral surface 44 of the annular portion 30 is formed so as to smoothly connect the leading edge 48 and the trailing edge 50 of the annular portion 30. With this configuration, it is possible to suppress the separation of flow on the outer peripheral surface 44 of the annular portion 30 when the annular portion 30 is in the second position P2, and it is possible to suppress the reduction in efficiency of the centrifugal compressor. Further, the thickness t of the leading edge portion 52 of the annular portion 30 decreases upstream in the axial direction, and the thickness t of the trailing edge portion 54 of the annular portion 30 decreases downstream in the axial direction. With this configuration, the increase in pressure loss due to the flow impinging on the leading edge portion 52 of the annular portion 30 can be suppressed, and the increase in pressure loss caused on the back side of the trailing edge portion 54 of the annular portion 30 can be suppressed.

Figure 6:
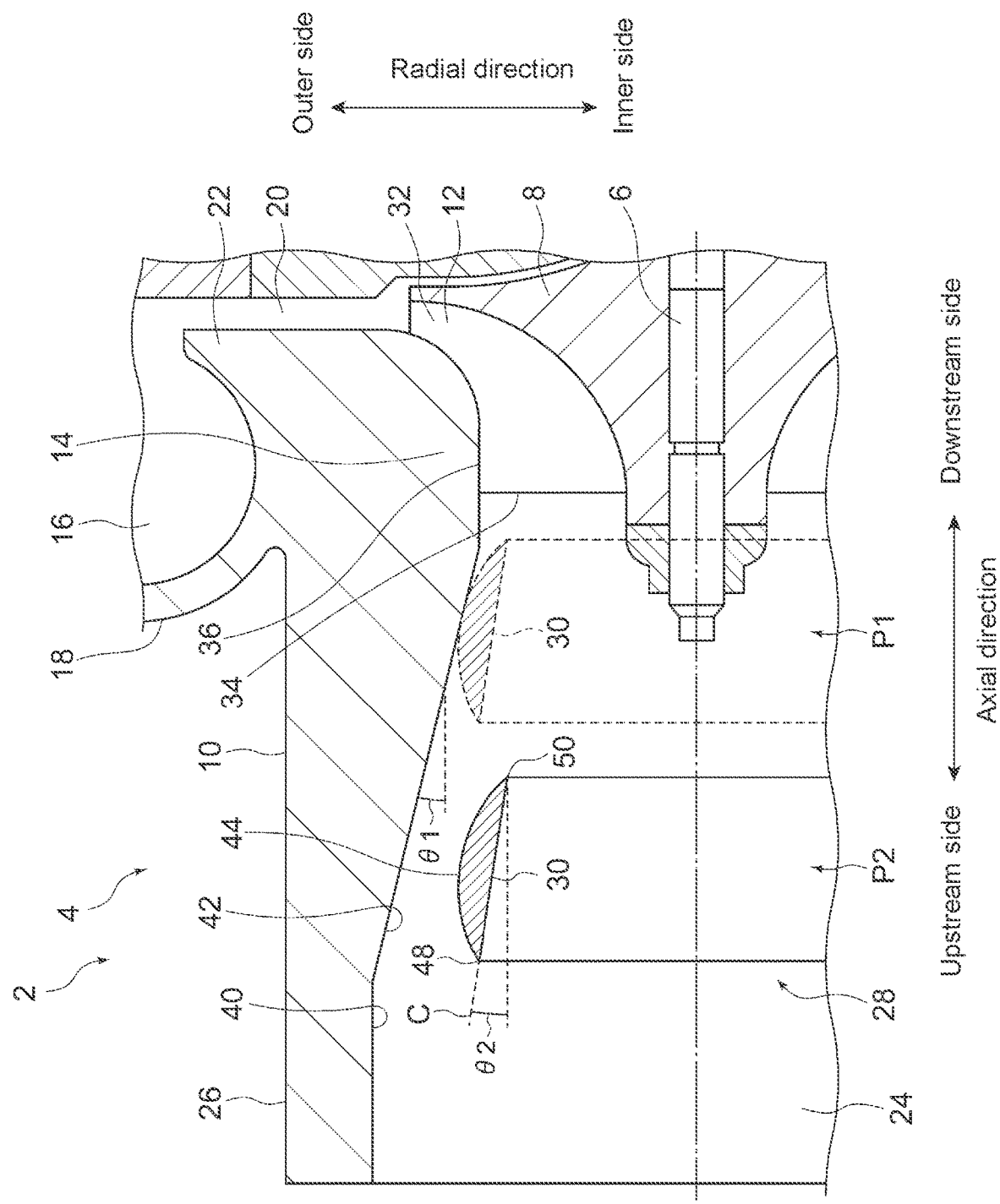
FIG. 6 is a schematic cross-sectional view of the centrifugal compressor 4 of the turbocharger 2 according to another embodiment.
Figure 7:
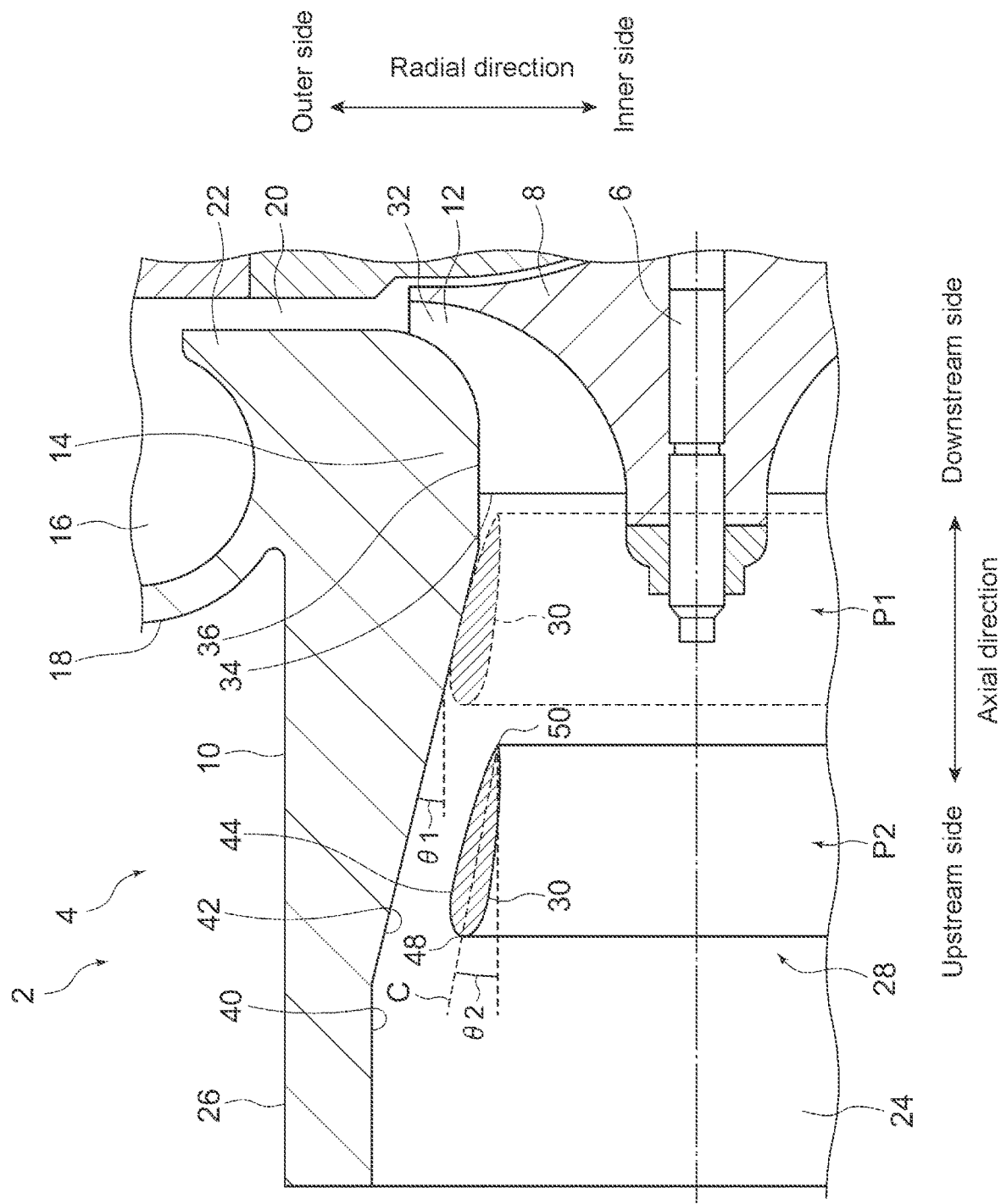
FIG. 7 is a schematic cross-sectional view of the centrifugal compressor 4 of the turbocharger 2 according to another embodiment.
Figure 8:
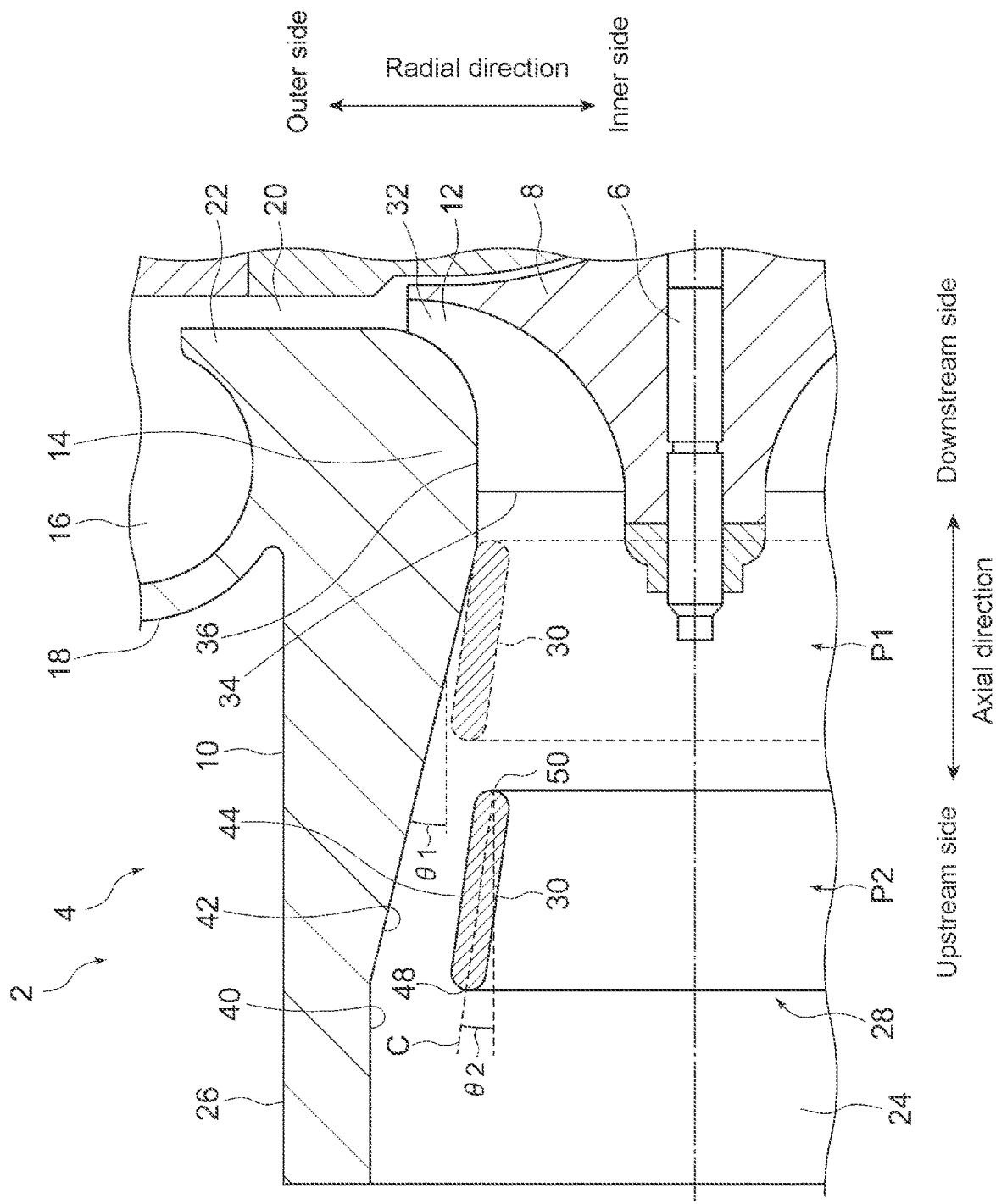
FIG. 8 is a schematic cross-sectional view of the centrifugal compressor 4 of the turbocharger 2 according to another embodiment.

In some embodiments, for example as shown in FIGS. 6 to 8, in a cross-section along the rotational axis of the impeller 8, the straight line C connecting the leading edge 48 and the trailing edge 50 of the annular portion 30 is inclined outward in the radial direction as it goes upstream in the axial direction. The cross-sectional shape of the annular portion 30 shown in FIG. 6, the cross-sectional shape of the annular portion 30 shown in FIG. 7, and the cross-sectional shape of the annular portion 30 shown in FIG. 8 correspond to the inclined cross-sectional shape of the annular portion 30 shown in FIG. 1, the inclined cross-sectional shape of the annular portion 30 shown in FIG. 3, and the inclined cross-sectional shape of the annular portion 30 shown in FIG. 5A, respectively.

Figure 9:
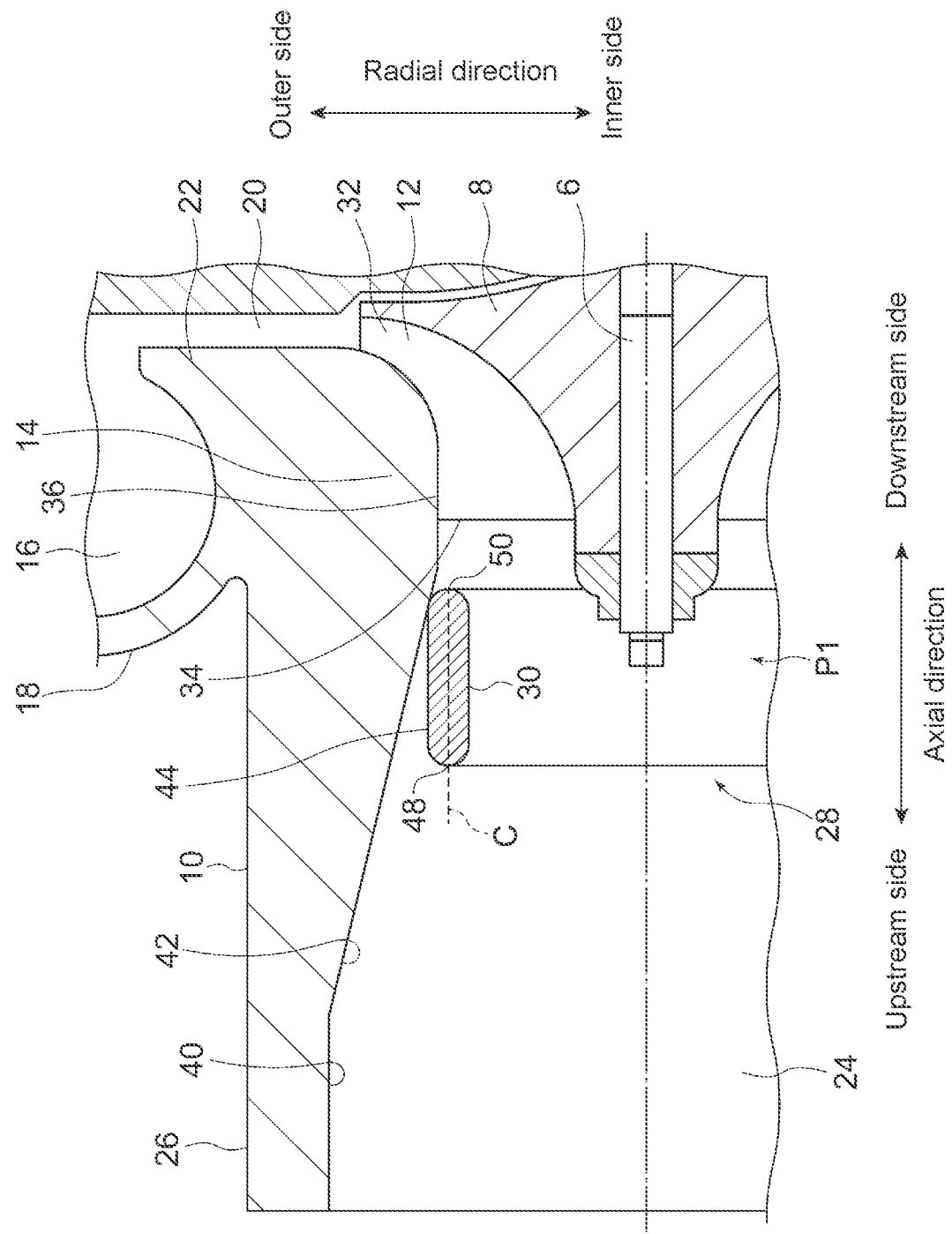
FIG. 9 is a schematic cross-sectional view of the centrifugal compressor 4 of the turbocharger 2 according to another embodiment.

In order to increase the effect of efficiency improvement at the low flow rate operating point by the throttle mechanism 28, it is desirable to secure a certain constriction amount of the flow passage area of the intake passage 24. Here, as shown in FIG. 9, in the annular portion 30 with the straight line C parallel to the axial direction, if the constriction amount by the throttle mechanism 28 is increased by increasing the thickness of the annular portion 30 (thickness in the direction perpendicular to the straight line C), the pressure loss when air passes through the annular portion 30 increases with the increase in thickness of the annular portion 30.

On the other hand, in the embodiments shown in FIGS. 6 to 8, since the straight line C is inclined as described above, the constriction amount by the throttle mechanism 28 can be increased while suppressing the increase in thickness of the annular portion 30. Accordingly, it is possible to efficiently increase the efficiency at the low flow rate operating point while suppressing the increase in pressure loss due to the thickness of the annular portion 30. Further, the increase in pressure loss can also be suppressed in that the air flow along the inclined surface 42 can be smoothly directed to the downstream side of the annular portion 30.

In some embodiments, for example as shown in FIGS. 6 to 8, in a cross-section along the rotational axis of the impeller 8, an angle $\theta 2$ (stagger angle) between the straight line C and the axial direction is smaller than an angle $\theta 1$ between the inclined surface 42 and the axial direction.

When the annular portion 30 is in the second position P2, since the annular portion 30 is separated from the inclined surface 42 inward in the radial direction, the angle between the streamline near the annular portion 30 and the axial direction is smaller than the angle $\theta 1$ between the inclined surface 42 and the axial direction. Therefore, when the angle $\theta 2$ is smaller than the angle $\theta 1$ as described above, the air can be smoothly directed along the annular portion 30, and the pressure loss due to the annular portion 30 can be effectively reduced.

Further, in the embodiments shown in FIGS. 6 and 7, since the outer peripheral surface 44 of the annular portion 30 has a shape with curvature (since the outer peripheral surface 44 is formed by a curved surface), the outer peripheral surface 44 comes into point contact with the inclined surface 42 in a cross-section along the rotational axis of the impeller 8, and the constriction amount by the throttle mechanism 28 can be increased while suppressing the increase in thickness of the annular portion 30. Accordingly, it is possible to efficiently increase the efficiency at the low flow rate operating point while suppressing the increase in pressure loss due to the thickness of the annular portion 30.

Figure 10:
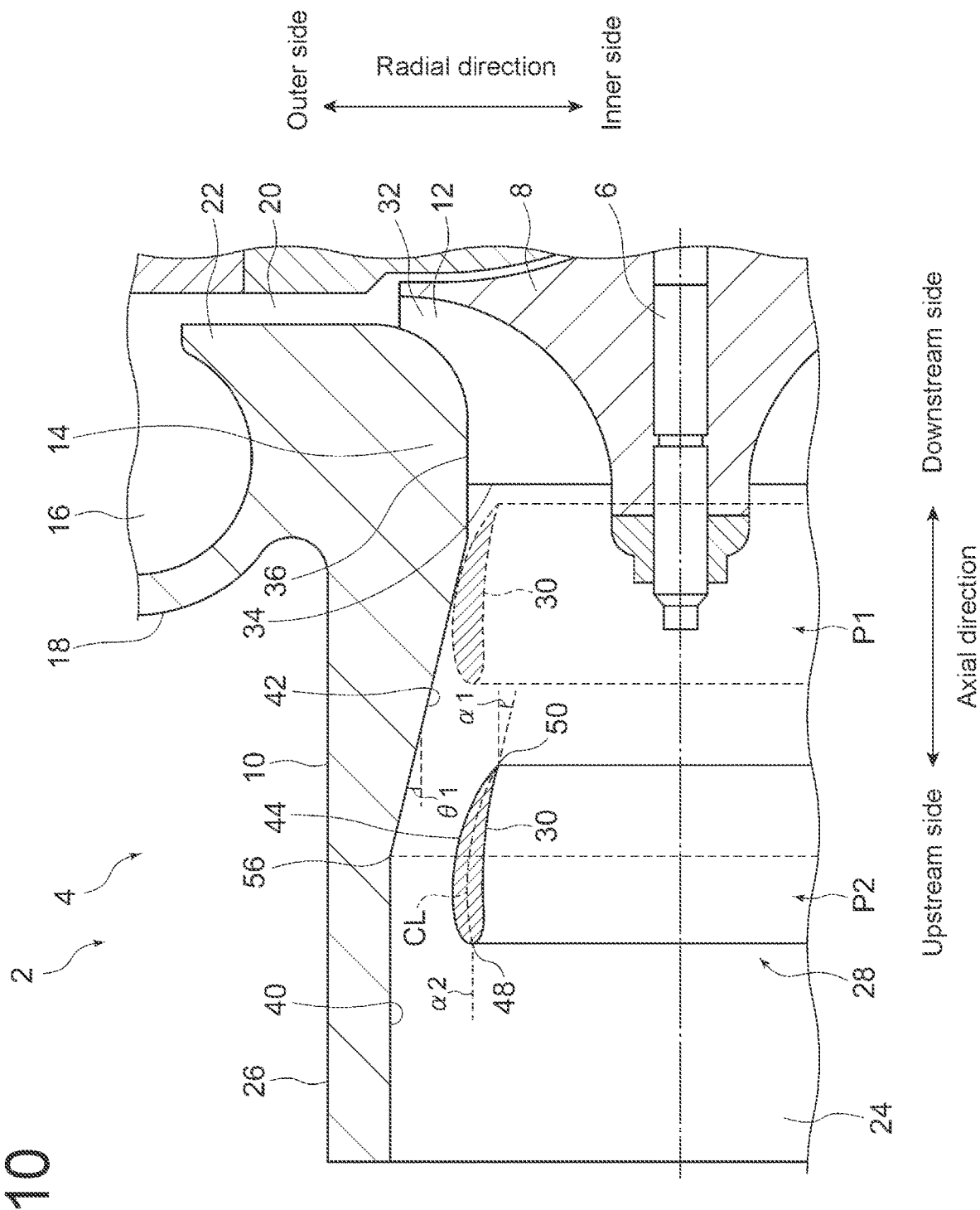
FIG. 10 is a schematic cross-sectional view of the centrifugal compressor 4 of the turbocharger 2 according to another embodiment.
Figure 11:
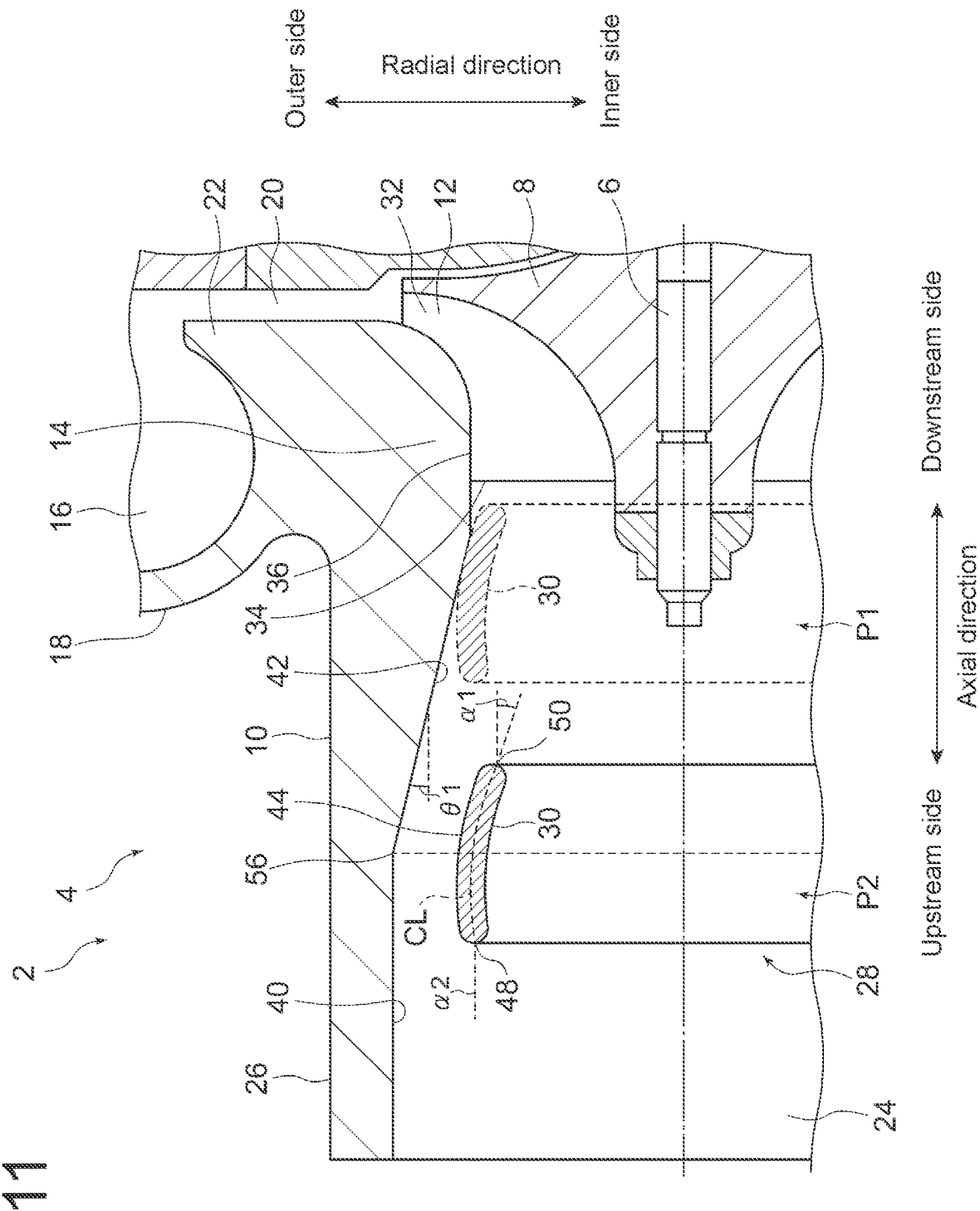
FIG. 11 is a schematic cross-sectional view of the centrifugal compressor 4 of the turbocharger 2 according to another embodiment.

In some embodiments, for example as shown in FIGS. 10 and 11, in a cross-section along the rotational axis of the impeller 8, when CL is a center line (camber line) connecting the leading edge 48 and the trailing edge 50 of the annular portion 30 and passing through the center position in the thickness direction of the annular portion 30, an angle $\alpha 1$ between the center line CL and the axial direction at the position of the trailing edge 50 is greater than an angle $\alpha 2$ (0° in the illustrated embodiments) between the center line CL and the axial direction at the position of the leading edge 48. The cross-sectional shape of the annular portion 30 shown in FIG. 10 corresponds to the cross-sectional shape of the annular portion 30 shown in FIG. 7 curved such that the center line CL is convex outward in the radial direction, and the cross-sectional shape of the annular portion 30 shown in FIG. 11 corresponds to the cross-sectional shape of the annular portion 30 shown in FIG. 8 curved such that the center line CL is convex outward in the radial direction.

In order to suppress the increase in pressure loss due to the annular portion 30, as shown in FIGS. 10 and 11, it is desirable that the leading edge 48 of the annular portion 30 is positioned upstream of the upstream end 56 of the inclined surface 42 (where the flow passage area of the inlet pipe portion 26 is maximum and the flow velocity is small) when the annular portion 30 is in the second position P2. In this case, streamlines around the annular portion 30 are directed in the axial direction near the leading edge 48 of the annular portion 30 and are directed in the radial direction near the trailing edge 50 of the annular portion 30. Therefore, as described above, when the angle $\alpha 1$ (trailing edge metal angle) between the center line CL and the axial direction at the position of the trailing edge 50 is greater than the angle $\alpha 2$ (leading edge metal angle) between the center line CL and the axial direction at the position of the leading edge 48, the shape of the annular portion 30 can be adapted to the change in curvature of the streamlines, and the increase in pressure loss due to the annular portion 30 can be suppressed. Further, since the center line CL smoothly connects the leading edge 48 and the trailing edge 50, and the center line CL has a smooth curvature change from the leading edge 48 to the trailing edge 50, the air can be smoothly directed along the annular portion 30 toward the impeller 8.

Further, in the embodiments shown in FIGS. 10 and 11, in a cross-section along the rotational axis of the impeller 8, the angle $\alpha 1$ between the center line CL and the axial direction at the position of the trailing edge 50 is smaller than the angle $\theta 1$ between the inclined surface 42 and the axial direction.

As described above, when the annular portion 30 is in the second position P2, since the annular portion 30 is separated from the inclined surface 42 inward in the radial direction, the angle between the streamline near the trailing edge 50 of the annular portion 30 and the axial direction is smaller than the angle $\theta 1$ between the inclined surface 42 and the axial direction. Therefore, when the angle $\alpha 1$ is smaller than the angle $\theta 1$ as described above, the increase in pressure loss near the trailing edge 50 of the annular portion 30 can be suppressed.

Figure 12:
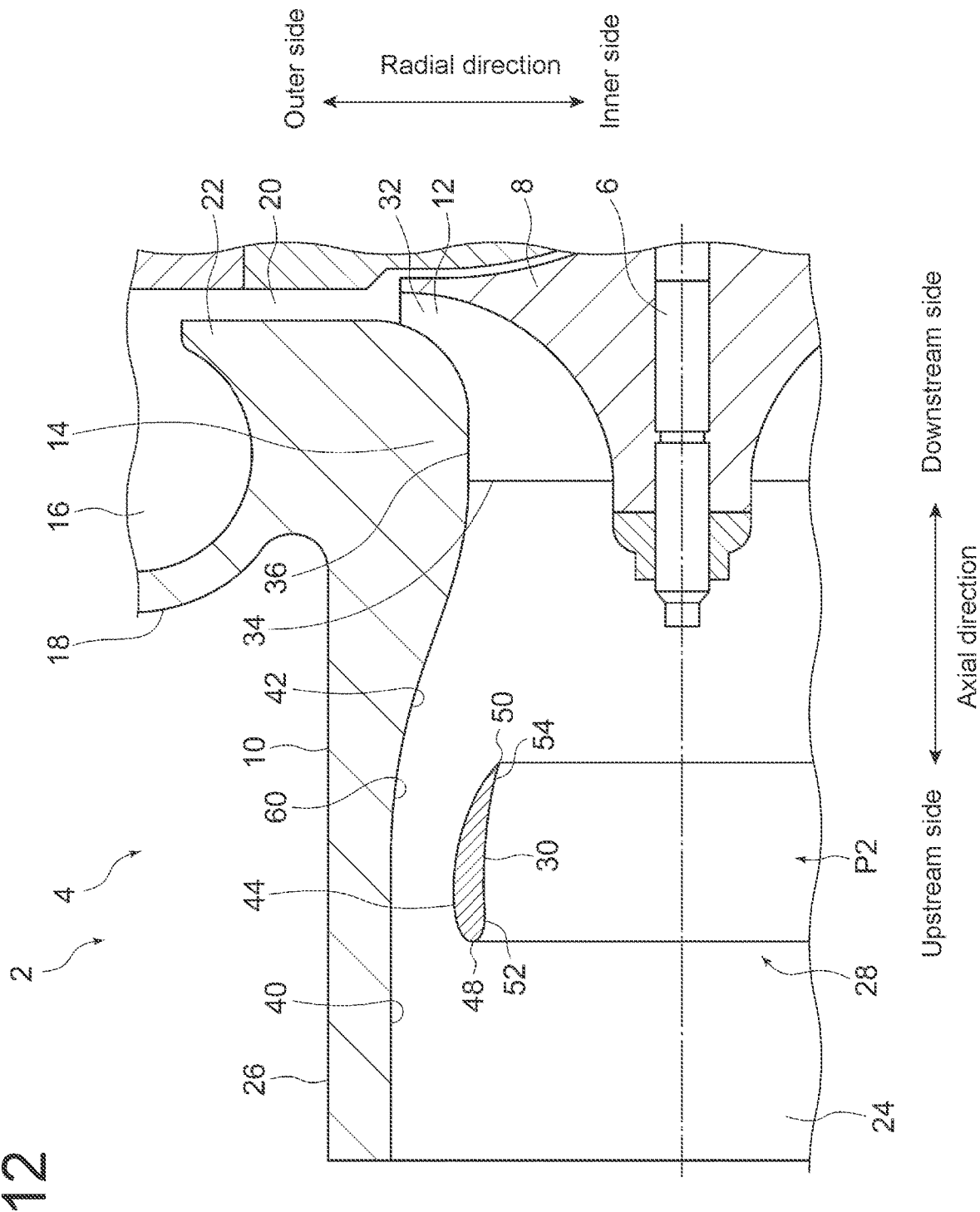
FIG. 12 is a schematic cross-sectional view of the centrifugal compressor 4 of the turbocharger 2 according to another embodiment.
Figure 13:
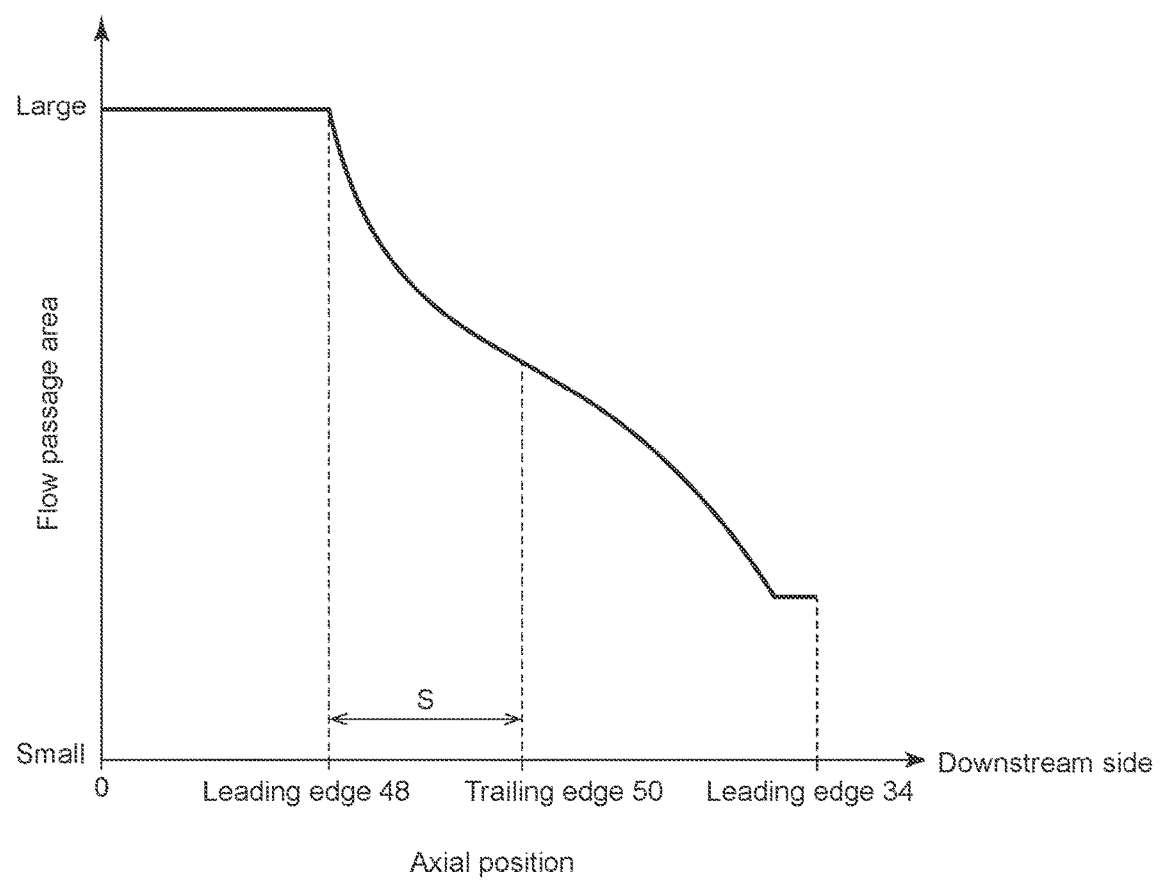
FIG. 13 is a flow passage area distribution diagram showing a relationship between the flow passage area of the intake passage 24 and the axial position in the centrifugal compressor 4 shown in FIG. 12.

FIG. 12 is a schematic cross-sectional view of the centrifugal compressor 4 of the turbocharger 2 according to another embodiment. FIG. 13 is a flow passage area distribution diagram showing a relationship between the flow passage area of the intake passage 24 and the axial position in the centrifugal compressor 4 shown in FIG. 12.

In some embodiments, for example as shown in FIG. 12, the inner peripheral surface 40 of the inlet pipe portion 26 includes a concave curved surface 60 formed so as to face the outer peripheral surface 44 of the annular portion 30 when the annular portion 30 is in the second position P2. The concave curved surface 60 is formed to be concave outward in the radial direction. Further, as shown in FIG. 13, the concave curved surface 60 is formed such that the flow passage area of the intake passage 24 does not have a minimum value in an existence range S of the annular portion 30 in the axial direction when the annular portion 30 is in the second position P2. In other words, the concave curved surface 60 is configured such that no throat is formed between the inner peripheral surface 40 of the inlet pipe portion 26 and the outer peripheral surface 44 of the annular portion 30. The "flow passage area of the intake passage 24" here means the flow passage area obtained by subtracting the cross-sectional area of the annular portion 30 (area of the cross-section perpendicular to the axial direction) from the flow passage area defined by the inner diameter of the inlet pipe portion 26.

Figure 14:
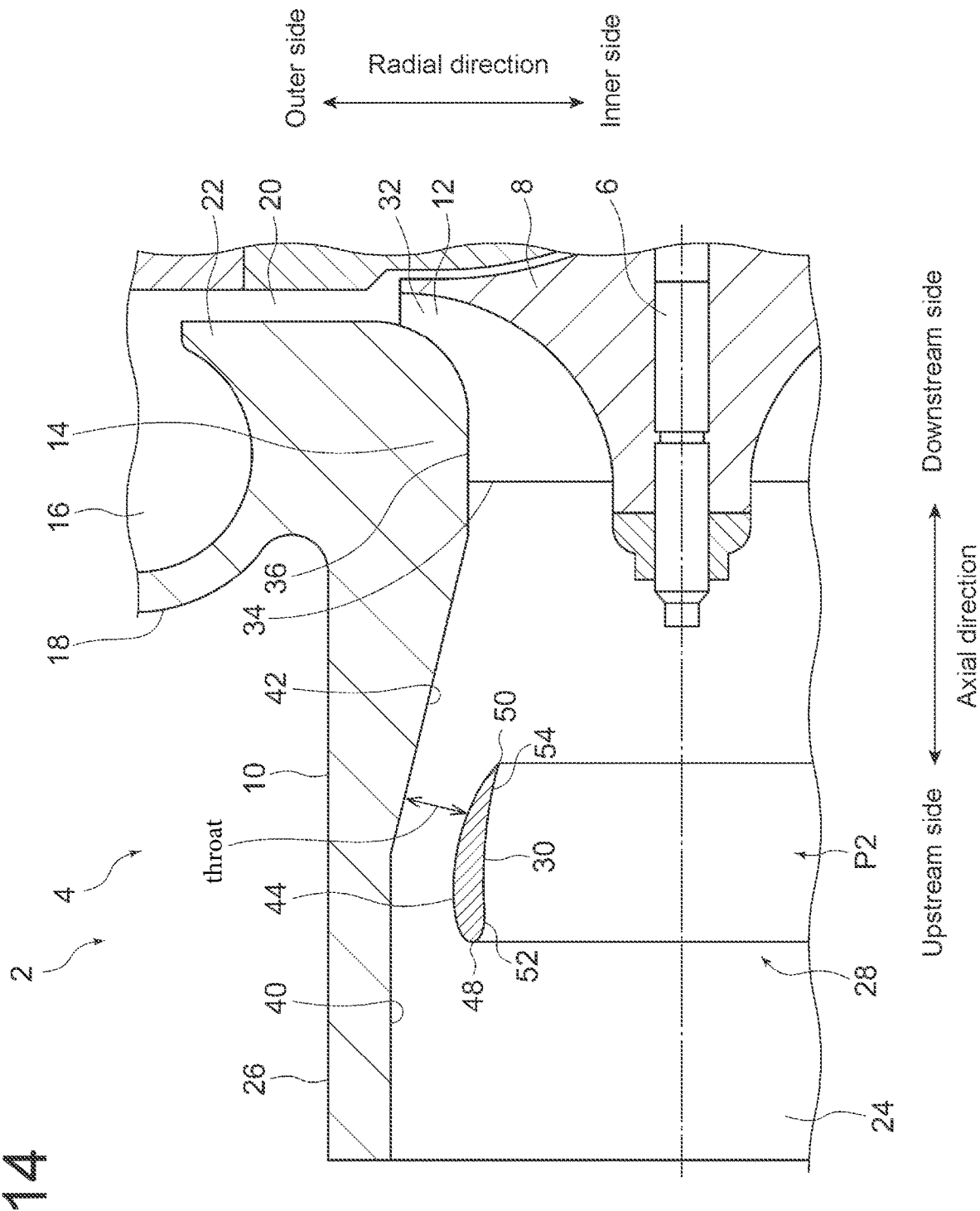
FIG. 14 is a schematic cross-sectional view of the centrifugal compressor 4 of the turbocharger 2 according to another embodiment.
Figure 15:
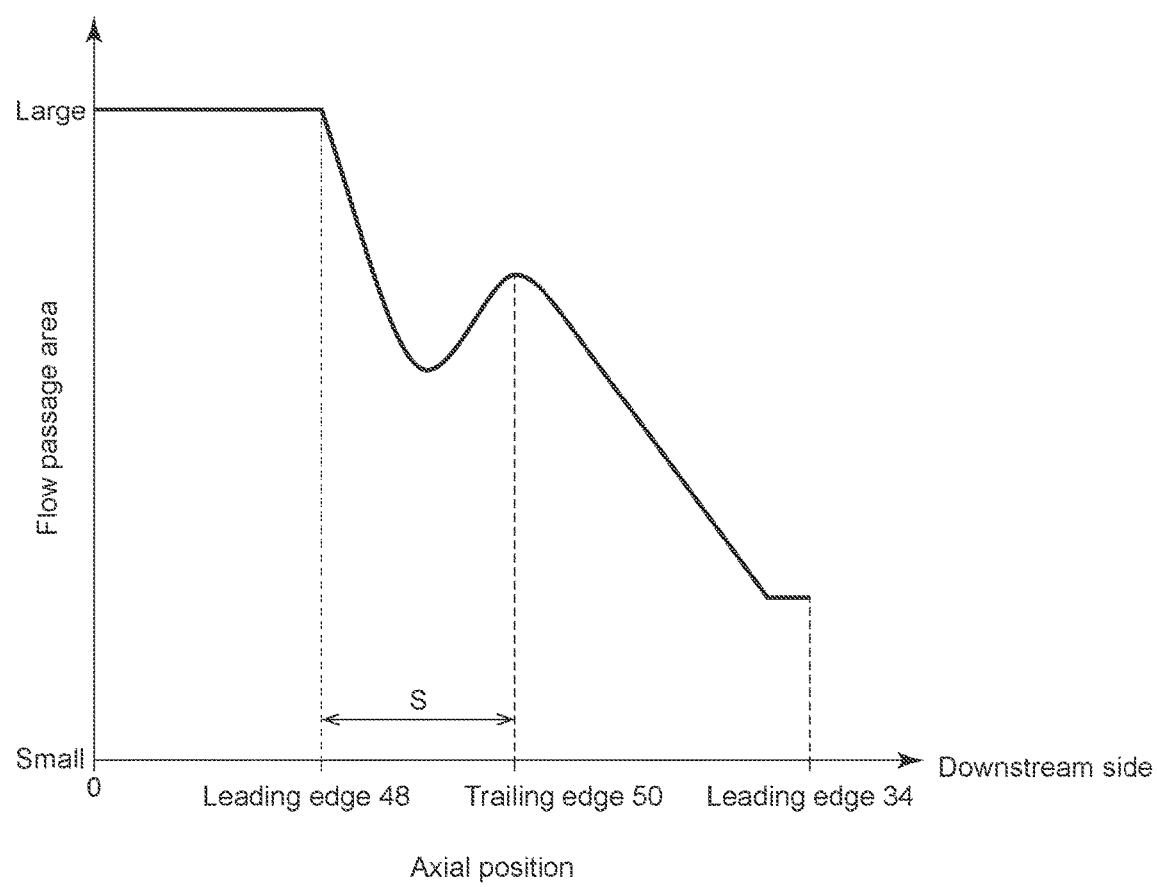
FIG. 15 is a flow passage area distribution diagram showing a relationship between the axial position in the centrifugal compressor 4 shown in FIG. 14 and the flow passage area of the intake passage 24.

As in the embodiment shown in FIG. 14, when the inclined surface 42 is formed so as to extend outward in the radial direction as it goes upstream in the axial direction in a cross-section along the rotational axis of the impeller 8, as shown in FIG. 15, the flow passage area of the intake passage 24 may have a minimum value in the existence range S of the annular portion 30 in the axial direction. In other words, a throat may be formed between the inner peripheral surface 40 of the inlet pipe portion 26 and the outer peripheral surface 44 of the annular portion 30 as shown in FIG. 14. In this case, the flow velocity increases locally at the throat, which can cause the increase in pressure loss.

However, as shown in FIGS. 12 and 13, when the concave curved surface 60 is formed on the inner peripheral surface 40 of the inlet pipe portion 26 such that the flow passage area of the intake passage 24 does not have a minimum value, a configuration in which no throat is formed between the inner peripheral surface 40 of the inlet pipe portion 26 and the outer peripheral surface 44 of the annular portion 30 can be achieved, so that the increase in pressure loss can be effectively suppressed.

The present invention is not limited to the embodiments described above, but includes modifications to the embodiments described above, and embodiments composed of combinations of those embodiments.

For example, in FIGS. 1, 5A to 5D, 6 and 8, etc., the leading edge portion 52 and the trailing edge portion 54 of the annular portion 30 have the same cross-sectional shape, but the leading edge portion 52 and the trailing edge portion 54 of the annular portion 30 may have different cross-sectional shapes, and the above-described shapes of the leading edge portion 52 and the trailing edge portion 54 may be combined as desired.

REFERENCE SIGNS LIST

2 Turbocharger
4 Centrifugal compressor
6 Rotational shaft
8 Impeller
10 Casing
12 Impeller housing space
14 Shroud wall portion
16 Scroll passage
18 Scroll portion
20 Diffuser passage
22 Diffuser portion
24 Intake passage
26 Inlet pipe portion
28 Throttle mechanism
30 Annular portion
32 Blade
34 Leading edge
36 Tip portion
38 Outer peripheral portion
40 Inner peripheral surface
42 Inclined surface
44 Outer peripheral surface
48 Leading edge
50 Trailing edge
52 Leading edge portion
54 Trailing edge portion
56 Upstream end
58 Inner peripheral surface
60 Concave curved surface

The invention claimed is:

1. A centrifugal compressor, comprising:
an impeller;
an inlet pipe portion forming an intake passage to introduce air to the impeller; and
a throttle mechanism capable of reducing a flow passage area of the intake passage upstream of the impeller,
wherein the throttle mechanism includes an annular portion configured to move between a first position and a second position upstream of the first position in an axial direction of the impeller,
wherein, in a cross-section along a rotational axis of the impeller, an outer peripheral surface of the annular portion is formed to smoothly connect a leading edge and a trailing edge of the annular portion, and
wherein, in a cross-section along the rotational axis of the impeller, when CL is a center line connecting the leading edge and the trailing edge of the annular portion and passing through a center position in a thickness direction of the annular portion, an angle between the center line CL and the axial direction at a position of the trailing edge is greater than an angle between the center line CL and the axial direction at a position of the leading edge.

2. The centrifugal compressor according to claim 1,
wherein an inner peripheral surface of the inlet pipe portion includes an inclined surface that is inclined such that an inner diameter of the inlet pipe portion increases upstream in the axial direction, and
wherein, in a cross-section along the rotational axis of the impeller, the angle between the center line CL and the axial direction at the position of the trailing edge is smaller than an angle between the inclined surface and the axial direction.

3. The centrifugal compressor according to claim 1,
wherein the center line CL has a smooth curvature change from the leading edge of the annular portion to the trailing edge.

4. A turbocharger, comprising the centrifugal compressor according to claim 1.

* * * * *